United States Patent
Pajaniradja et al.

(10) Patent No.: US 12,520,063 B2
(45) Date of Patent: Jan. 6, 2026

(54) SMART IMAGER FOR REAL-TIME INTENSIVE IMAGE ANALYSIS

(71) Applicant: COMMISSARIAT A L'ENERGIE ATOMIQUE ET AUX ENERGIES ALTERNATIVES, Paris (FR)

(72) Inventors: Suresh Pajaniradja, Gif-sur-Yvette (FR); Benoit Tain, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 63 days.

(21) Appl. No.: 18/732,917

(22) Filed: Jun. 4, 2024

(65) Prior Publication Data
US 2024/0406603 A1    Dec. 5, 2024

(30) Foreign Application Priority Data
Jun. 5, 2023   (FR) ........................................ 2305638

(51) Int. Cl.
*H04N 25/79*    (2023.01)
*H04N 25/772*   (2023.01)

(52) U.S. Cl.
CPC ........... *H04N 25/79* (2023.01); *H04N 25/772* (2023.01)

(58) Field of Classification Search
None
See application file for complete search history.

(56) References Cited

U.S. PATENT DOCUMENTS

| | | |
|---|---|---|
| 2019/0297295 A1 | 9/2019 | Roberts et al. |
| 2020/0321374 A1 | 10/2020 | Ion et al. |
| 2021/0092318 A1 | 3/2021 | Roberts et al. |
| 2021/0305295 A1 | 9/2021 | Ion et al. |

(Continued)

FOREIGN PATENT DOCUMENTS

| | | |
|---|---|---|
| CN | 102665049 B | 9/2014 |
| EP | 3 971 979 A1 | 3/2022 |
| WO | WO 2017/161060 A1 | 9/2017 |

OTHER PUBLICATIONS

Preliminary French Search Report issued Feb. 15, 2024 in French Application 2305638 filed on Jun. 5, 2023, 12 pages (with English Translation of Categories of Cited Documents & Written Opinion).

(Continued)

*Primary Examiner* — Mark T Monk
(74) *Attorney, Agent, or Firm* — Oblon, McClelland, Maier & Neustadt, L.L.P.

(57) ABSTRACT

A smart imager including a three-dimensional integrated circuit including a stack of at least two integrated circuit layers: a sensor layer with an array of pixels, and one or more processing layer(s). The three-dimensional integrated circuit includes: a conversion block including a plurality of analog-to-digital converters at the root of the column of pixels, a parallel processing processor including several computing units each including several elementary processors and a shared memory, a data bus and a control block configured to convey the digital data at the output of the conversion block directly towards the shared memories of the computing units, all of the digital data representative of the same row of pixels being conveyed simultaneously towards different computing units.

10 Claims, 10 Drawing Sheets

(56) References Cited

U.S. PATENT DOCUMENTS

Figure 1:
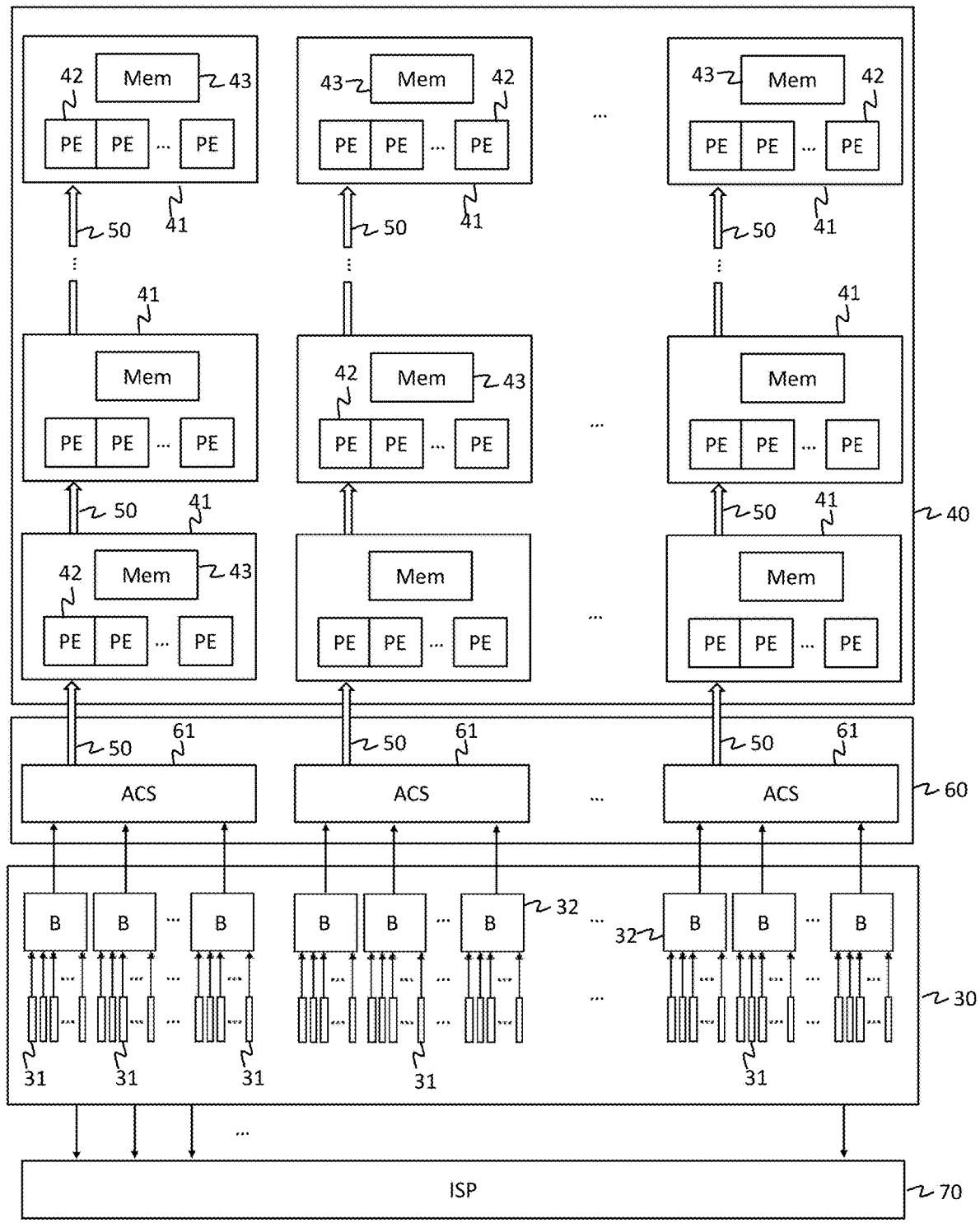

2022/0086383 A1* 3/2022 Shigiya .................. H04N 25/79
2022/0345658 A1  10/2022 Roberts et al.

OTHER PUBLICATIONS

Millet et al., "A 5500-frames/s 85-GOPS/W 3-D Stacked BSI Vision Chip Based on Parallel In-Focal-Plane Acquisition and Processing", IEEE Journal of Solid-State Circuits, vol. 54, No. 4, 2019, 10 pages.

* cited by examiner

SMART IMAGER FOR REAL-TIME INTENSIVE IMAGE ANALYSIS

FIELD OF THE INVENTION

The present invention relates to the field of smart imagers. A smart imager is a system integrating a vision sensor and an image processing processor. The invention is particularly well-suited to the case of a smart imager including a high-resolution vision sensor and a parallel processor adapted to implement an intensive image analysis processing based on an artificial intelligence algorithm.

PRIOR ART

In a smart imager including a high-resolution vision sensor and an intensive image analysis processing, the interface between the sensor and the processing processor is particularly difficult to implement. Because of the large amount of data originating from the sensor, on the one hand, and the complexity of the processing processor, on the other hand, the interface between the sensor and the processing processor often introduces a latency in the processing performed by the processor.

In general, the vision sensor is in the form of an array of pixels. Each pixel includes a photodetector configured to supply an analog signal representative of a luminous intensity received by the photodetector. Each pixel is connected to an analog-to-digital converter (ADC) via a readout circuit to transform the analog signal into digital data. To enable image analysis in real-time, the digital data representative of the pixels of the sensor should be conveyed towards the processing processor with minimum latency.

To perform an intensive image analysis processing, it is advantageous to use a processing processor with a parallel architecture. Such a processor is organised into several parallel computing units. Each computing unit includes several elementary processors as well as a memory shared between these elementary processors. Such a processor is particularly well-suited for the implementation of an image analysis artificial intelligence algorithm.

Conventional smart imagers include a buffer memory and a sequencer positioned between the sensor and the processing processor. To perform the image processing, the digital data representative of the pixels of the sensor are first memorised in the buffer memory, then sequentially conveyed towards the shared memories of the different computing units using the sequencer.

The patent application WO 2014/057106 A1 describes an image sensor comprising several groups of pixels as well as analog-to-digital converters at the column root (each converter is configured to carry out the analog-to-digital conversion of the pixel signals of a column of a group of pixels). The digitised data are stored in a buffer memory formed by several memory banks. The sequencer is configured to read the memory banks and export the pixel digital data towards an output interface to an image processing processor.

The patent application WO 2017/161060 A1 describes an imager in the form of a three-dimensional integrated circuit. An array of pixels is implemented on a first layer of the imager. A second layer of the imager includes a readout circuit and analog-to-digital converters according to a structure in groups: the array of pixels is divided into several groups of pixels and each group of pixels is associated with an analog-to-digital converter ("cluster ADC" type structure). The pixel digital data are memorised in a buffer memory before being exported towards an image analysis processor.

The document "3D Integration Technologies for the Stacked CMOS Image Sensors", Y. Kagawa et al., 2019 International 3D Systems Integration Conference (3DIC), also describes an imager in the form of a three-dimensional integrated circuit. An array of pixels is implemented on a first layer of the imager, and analog-to-digital converters positioned at the root of the columns of the array of pixels feed a buffer memory implemented on a second layer of the imager. This buffer memory allows temporarily storing the pixel digital data before being sequentially exported towards an image analysis processor.

All of the imagers described hereinbefore have the drawback of introducing latency in the image analysis processing.

The patent application EP 3971979 A1 describes a three-dimensional integrated circuit architecture allowing optimising the distribution of the analog and digital components in a stack of at least three semiconductor layers. Such an architecture may in particular be adapted to make an integrated circuit for an imager (image sensor).

SUMMARY OF THE INVENTION

The purpose of the present invention is to overcome all or part of the drawbacks of the prior art, in particular those described hereinabove.

To this end, and according to a first aspect, a smart imager is proposed by the present invention comprising a three-dimensional integrated circuit including a stack of at least two integrated circuit layers. Each layer is electrically connected to at least one other layer by means of through electrical connections. The layers comprise an upper layer, so-called "sensor layer", and one or more lower layer(s), so-called "processing layers". The sensor layer comprises a photosensitive sensor including an array of pixels, each pixel being configured to supply an analog signal representative of a received luminous intensity. The three-dimensional integrated circuit includes a conversion block implemented on the sensor layer and/or on one or more processing layer(s), a parallel processing processor implemented on one or more processing layer(s), a data bus and a control block implemented on the processing layer(s) on which the parallel processing processor is implemented. The conversion block comprises a plurality of analog-to-digital converters each respectively associated with a column of the array of pixels. The conversion block is configured to transform the analog signals supplied by the pixels into digital data. The parallel processing processor includes a plurality of computing units, each computing unit including several elementary processors and a shared memory between the elementary processors of the computing unit. The data bus and the control block are configured to convey the digital data at the output of the conversion block directly towards the shared memories of the computing units, all of the digital data representative of the same row of pixels being conveyed simultaneously towards different computing units.

Advantageously, the control block can be configured to convey the same digital data towards at least two distinct computing units by transmitting said digital data only once on the data bus.

Such arrangements allow making a redundancy function (for example when the same pixel digital data are transmitted to at least two distinct computing units) or a thumbnail processing function with overlapping areas (for example when only one portion of the pixel digital data intended for a computing unit is also transmitted to another computing unit). Being able to transmit the same digital data to several distinct computing units in one single transmission on the data bus avoids introducing latency in the processing.

An "integrated circuit" is also so-called "microelectronic circuit" or "electronic chip". An integrated circuit comprises analog and/or digital active electronic components made from a semiconductor material, as well as metal tracks allowing electrically interconnecting the electronic components together.

In the present application, an "integrated circuit layer" corresponds to a planar (2D) microelectronic circuit which forms a portion of the three-dimensional (3D) integrated circuit forming the imager. The different layers (also commonly referred to as "tiers") are stacked vertically on top of one another (the vertical being defined by the direction of stacking of the layers). The term "layer" herein has the same meaning as the term "level" (the 3D integrated circuit is formed by a stack of several circuit "levels").

A layer of the stack may be electrically connected to another layer by means of vias. A via is a metal connection allowing crossing the semiconductor substrate of a layer vertically to electrically connect two electronic components made in two different layers of the stack).

Different manufacturing methods may be considered to make the different layers of the stack. According to a first example, known as "parallel 3D integration" ("3D stacking" or "3D packaging"), the different layers are made independently of each other from different wafers, and then the layers are superposed and interconnected by TSV-type (acronym standing for "Through-Silicon Via") connections. According to another example, known as "sequential 3D integration" or "monolithic 3D integration"), the different layers are directly made on top of one another. For example, after having made a first integrated circuit layer from a first semiconductor substrate, a second semiconductor substrate is affixed onto the first layer (for example by oxide-oxide bonding); the second substrate is then thinned; the electronic components of the second layer are then manufactured from the second substrate. In the case of a sequential 3D integration, the electrical connections between the layers are of the MIV type (acronym standing for "Monolithic Inter-tier Via"). The electrical connections between the different layers may also be made by means of contact pads or microbeads. It is also possible to consider making the stack of integrated circuit layers of the imager using a parallel 3D integration for a portion of the layers and a sequential 3D integration for another portion of the layers.

The sensor layer is the first layer of the stack (upper layer located at the top of the stack). The sensor layer may operate in the visible range or in the infrared range, depending on the targeted application. The processing layers are located beneath the sensor layer.

Each pixel of the photosensitive sensor corresponds to a photodetector formed for example by a photodiode (PN junction), a phototransistor, a photodiode associated with transfer gates, or a photodetector made in an organic or colloidal photosensitive layer.

For example, the sensor layer may be made according to a back-side illumination configuration (BSI sensor, standing for "Back-Side Illumination") or according to a front-side configuration (FSI sensor, standing for "Front-Side Illumination").

In the present application, the term "block" refers to a portion of the three-dimensional integrated circuit forming the imager and addressing a given logic function. One block may include different analog and/or digital electronic components. One block may be implemented on one single layer or on several layers of the three-dimensional integrated circuit.

The conversion block is intended to transform the analog signals supplied by the pixels into digital data. The conversion block may be implemented on one single layer, for example on the processing layer located directly beneath the sensor layer, or on a lower processing layer, and even on the sensor layer. Nonetheless, nothing prevents the conversion block from being implemented on several layers; for example, different portions of the conversion block may be implemented on several processing layers, or a portion of the conversion block may be implemented on the sensor layer and other portions of the conversion block may be implemented on one or more processing layer(s).

In particular embodiments, the conversion block is completely implemented on one or more processing layer(s).

In particular embodiments, the conversion block is completely implemented on one single processing layer.

In particular embodiments, the conversion block is completely implemented on the processing layer located immediately beneath the sensor layer.

In particular, the conversion block includes analog-to-digital converters (ADCs). The conversion block may also include other electronic components, like for example an analog circuit for amplifying and shaping the signals, a pixel row or column decoder, a pixel readout circuit ("readout circuit"), etc. The analog-to-digital converters (ADCs) of the conversion block are arranged at the root of the columns of the array of pixels of the photosensitive sensor ("column ADC" type arrangement). This arrangement allows effectively sharing the ADCs on the columns of pixels. Consequently, the surface occupied by the ADCs is optimised (the occupied surface is substantially smaller than for a "cluster ADC" type arrangement). The readout circuit ("readout circuit") is also substantially less complex. The arrangement of the ADCs at the column roots allows obtaining a higher density of photodetectors in the array of pixels, which allows improving the performances of the sensor (for example, in terms of signal-to noise or quantum efficiency).

In particular, the parallel processing processor may be configured to execute an intensive image analysis processing, for example for shape, object, face recognition or for event detection (for example movement detection or gesture recognition) in images. This intensive image analysis processing may be based on one more artificial intelligence algorithm(s).

Different implementation options may be considered for the parallel processing processor: it may be implemented completely on the processing layer located immediately beneath the sensor layer (second layer of the stack), it may be implemented in part on the second layer and in part on at least one other processing layer lower than the second layer, or it may be implemented on one or more processing layer(s) lower than the second layer.

In particular embodiments, the three-dimensional integrated circuit includes at least three layers, and the parallel processing processor is implemented in part on the processing layer which implements the conversion block and in part on at least one other processing layer.

The use of a 3D integrated circuit for making the smart imager confers several advantages. The stacked structure of the layers allows reducing the length of the electrical connections between the different electronic components made on the different layers, which allows optimising the performances. The 3D structure also allows distributing the different functional blocks over different layers according to their specificities. Each block could then be made according to the most suitable technology (each layer could be made with a different technology). The 3D structure also allows implementing an architecture with a high level of parallelisation of the tasks performed by the different circuits of the different layers.

Each computing unit of the processing processor is configured to process digital data corresponding to an area (a subset) of pixels of the array of pixels of the photosensitive sensor.

The data bus and the control block offer the function of a communication network allowing conveying the digital data at the output of the conversion block towards the different computing units. It is important to note that the digital data re conveyed "directly" from the conversion block towards the different computing units. This means that, in the proposed smart imager architecture, there is no intermediate buffer memory to memorise the digital data of pixels between an ADC and the processing processor. In other words, the digital data are conveyed directly from the conversion block towards the shared memories of the computing units without being memorised in another intermediate memory.

The elementary processors of the computing units of the processing processor are intended to be configured to read digital data memorised in the shared memory of the computing unit to which they belong, and to execute an image analysis algorithm directly from the read data (for example an artificial intelligence algorithm). This direct interface towards the computing units, without any intermediate buffer memory, allows processing the pixel data the earliest after the digital conversion, which allows for a substantial gain in terms of processing latency. The passage through an intermediate buffer memory further allows limiting the bulk of the imager and the power consumed by the imager.

The control block is configured such that all of the digital data representative of the same row of pixels are conveyed simultaneously towards different computing units. Thus, the computing units having received digital data relating to one or more row(s) of pixels of the array could begin processing thereof while digital data relating to one or more other row(s) of pixels are conveyed towards other computing units. This also allows reducing latency in the image analysis processing.

A piece of digital data at the output of the conversion block may be representative of one single pixel or of a group (an area) of pixels of the array of the photosensitive sensor.

In particular embodiments, the conversion block includes pixel grouping blocks, each pixel grouping block being connected to several analog-to-digital converters associated with several successive columns of the array of pixels, each pixel grouping block being configured to supply a piece of digital data representative of a group of pixels of the array of pixels.

For example, a piece of digital data may be representative of a group of M×N pixels, where M is a divider number (strictly smaller) of the number of columns of the array and N is a divider number (strictly smaller) of the number of rows of the array. In particular, the piece of digital data may correspond to an average (possibly weighted) of the M×N pixels. Such arrangements allow reducing the complexity of the intensive analysis processing by reducing the amount of digital data to be processed. This also allows for a reduction in the size and in the power consumed by the imager.

In particular embodiments, the computing units are arranged in an array-like fashion according to several rows and several columns, and the control block includes several control sub-blocks, each control sub-block being connected to all of the computing units of the same column via a branch of the data bus.

Thus, it is possible to be able to transmit the same digital data to several computing units of the same column only once.

In particular embodiments, the three-dimensional integrated circuit further includes an optimisation processor distinct from the parallel processing processor, implemented on one or more processing layer(s). Digital data at the output of the conversion block are conveyed to the optimisation processor via a route distinct from the data bus.

For example, the optimisation processor is adapted to execute the optimisation or error correction algorithm, and to output an image stream on an output interface, like for example a MIPI-type (acronym standing for "Mobile Industry Processor Interface", this consists of an alliance dedicated to the development of interface specifications for mobile products) interface.

The use of two distinct routes to convey the digital data towards the parallel processing processor and towards the optimisation processor enables a simultaneous processing for image improvement and for intensive image analysis. Thanks to this decoupling, the image optimisation and/or optical defect correction processing implemented by the optimisation processor does not add any additional latency to the intensive image analysis processing implemented by the parallel processing processor (the improvement and the defect correction implemented by the optimisation processor is not necessary for the image analysis processing implemented by the parallel processing processor).

Different options may be considered to convey the digital data at the output of the conversion block towards the computing units of the parallel processing processor.

In some embodiments, the transport of data is done "point-to-point", or "point-to-multipoint": the control block is then configured to encapsulate digital data into a message including at least one addressing identifier corresponding to at least one computing unit, and to broadcast said message over the data bus towards several computing units; each computing unit includes a filtering block configured to detect, according to said at least one addressing identifier, whether the encapsulated digital data in the message should be processed by the computing unit or not.

In particular embodiments, the data transport is implemented by broadcasting: each computing unit then includes a filtering block configured to detect, according to a number of received digital data, whether or not a received piece of digital data should be processed by the computing unit.

PRESENTATION OF THE FIGURES

Figure 2:
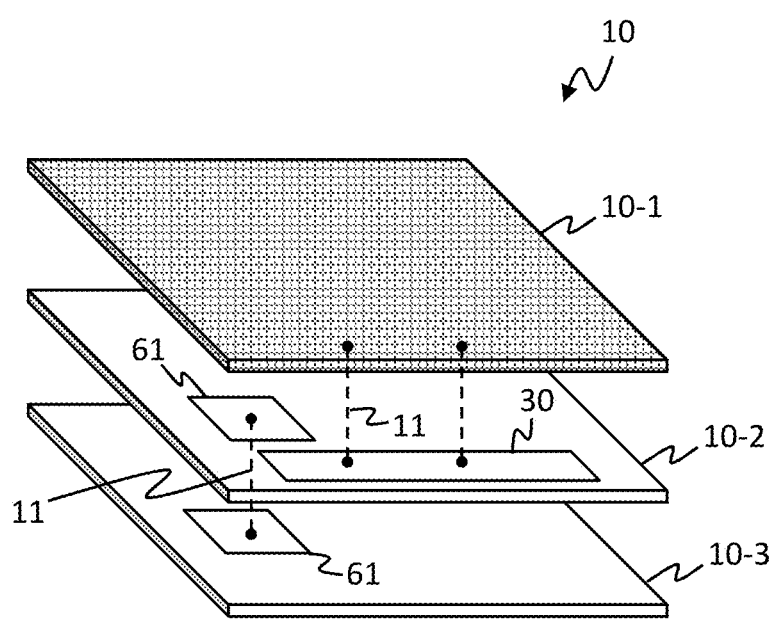
Figure 3:
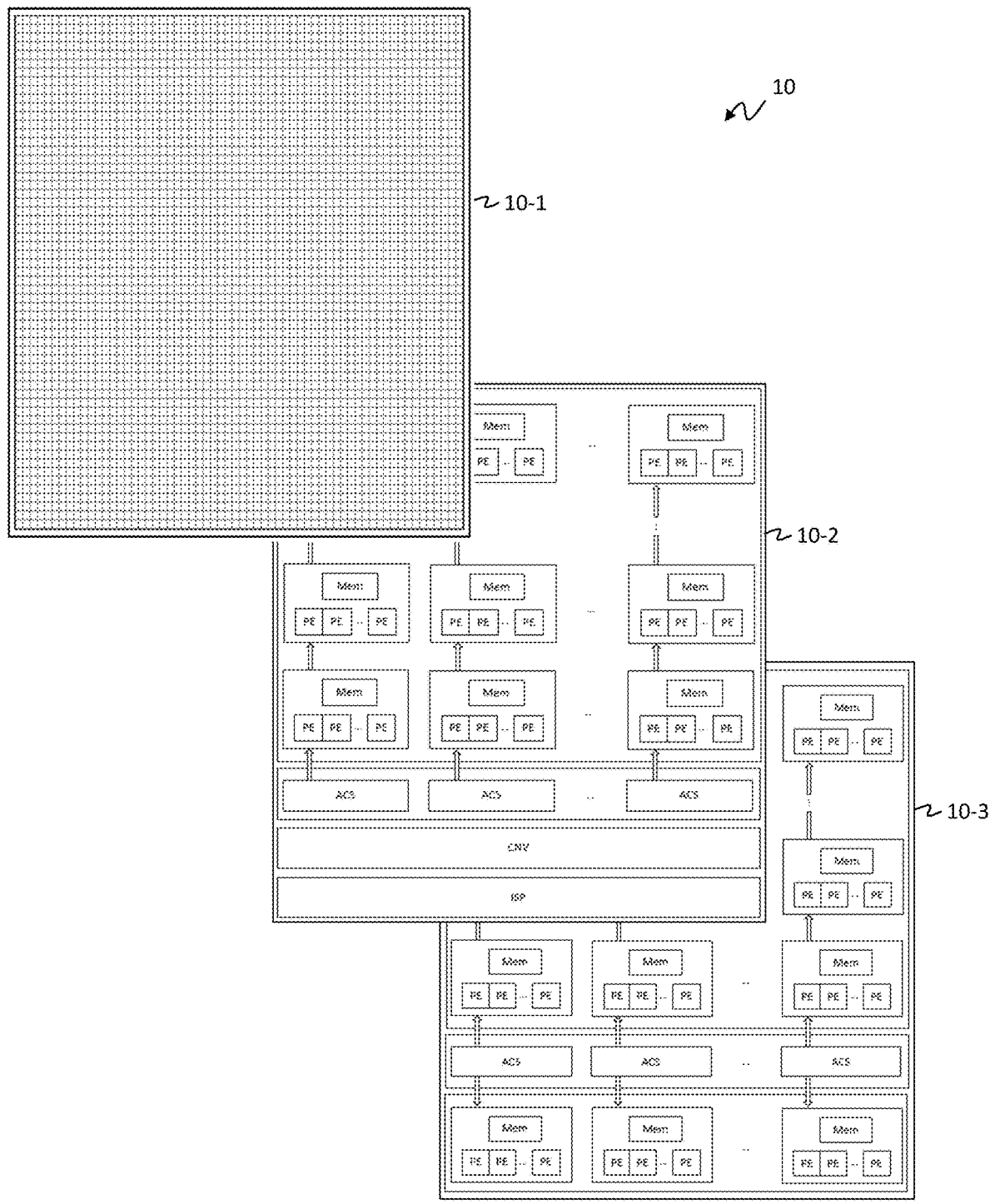
Figure 4:
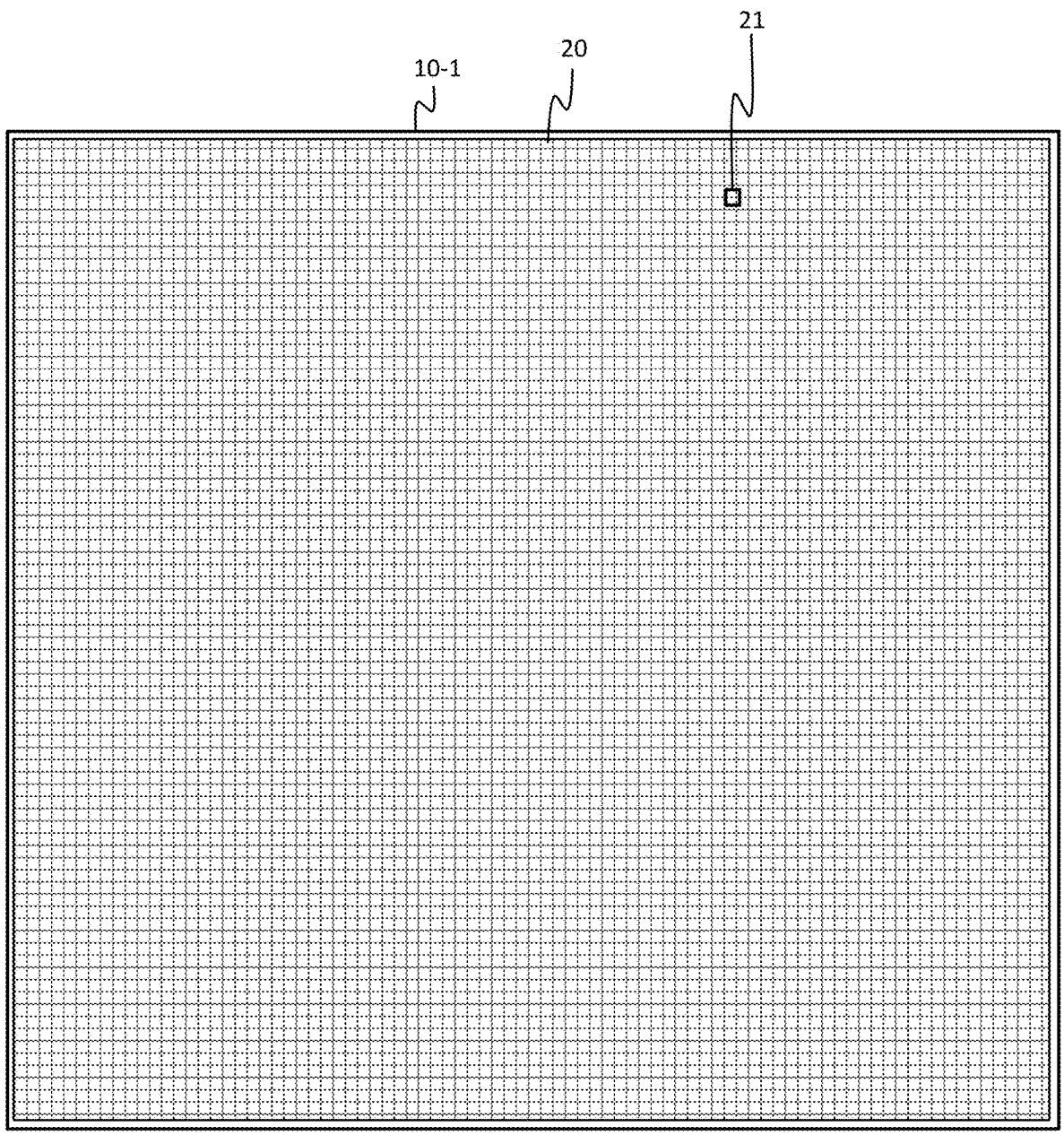
Figure 5:
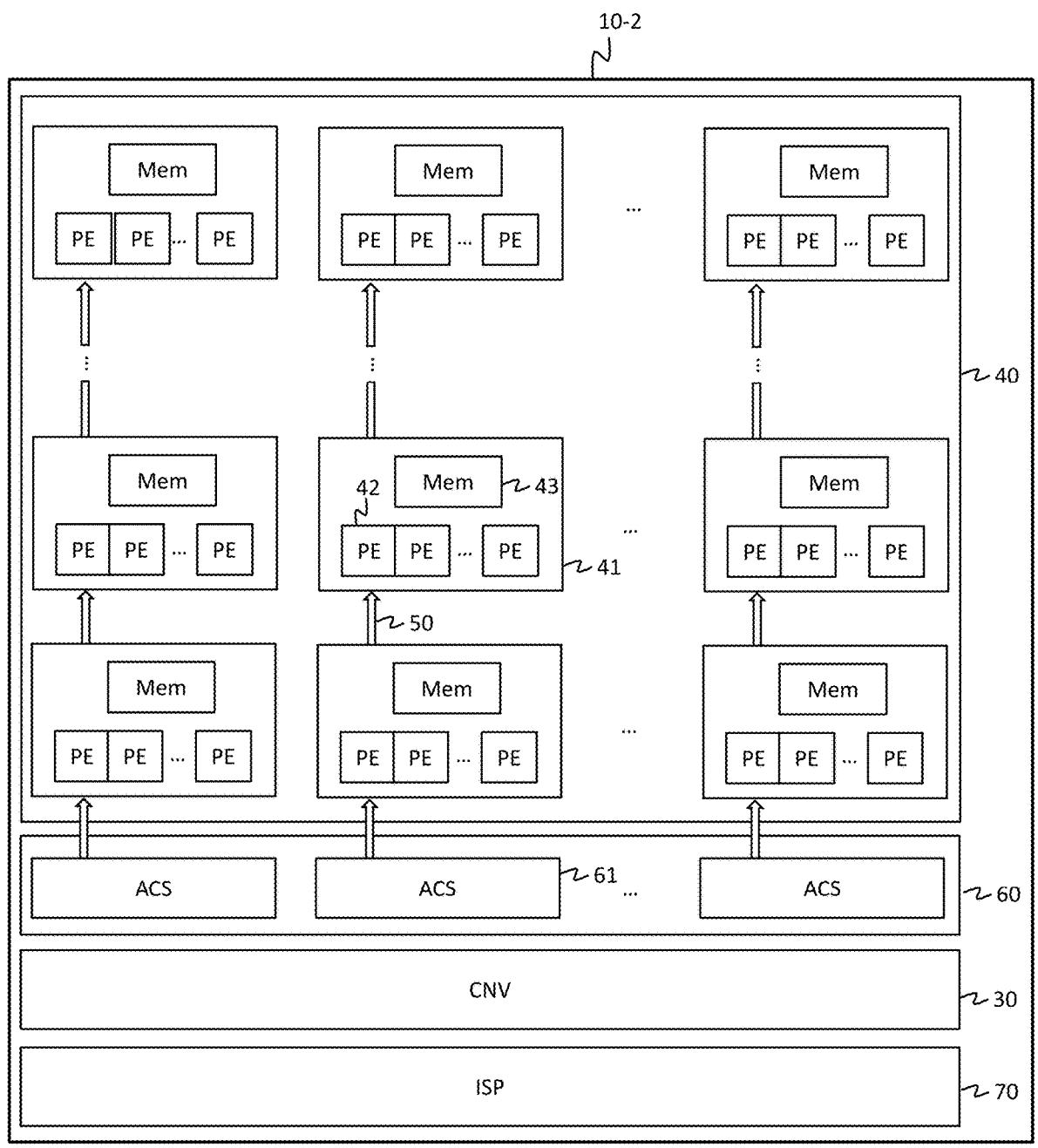
Figure 6:
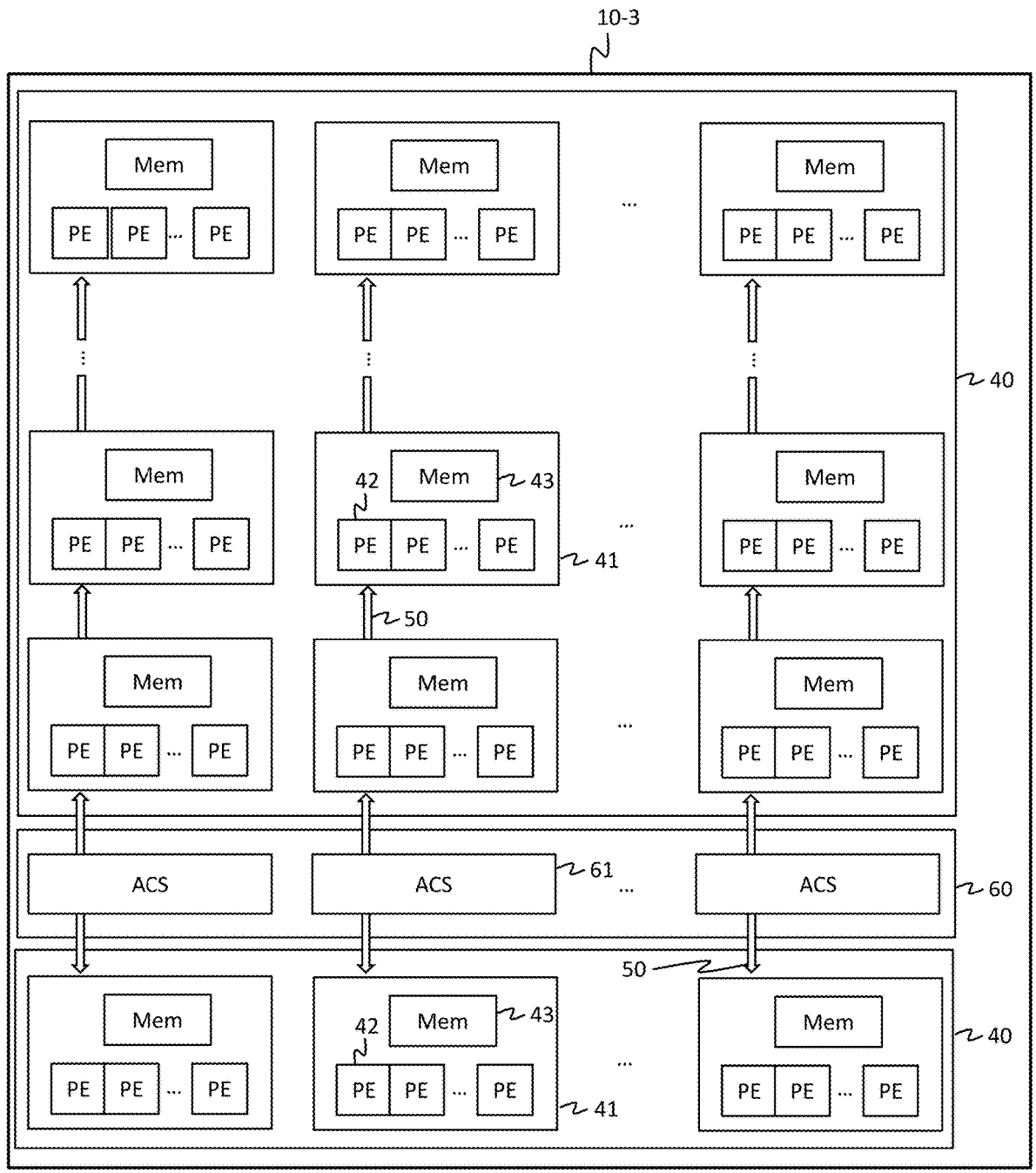
Figure 7:
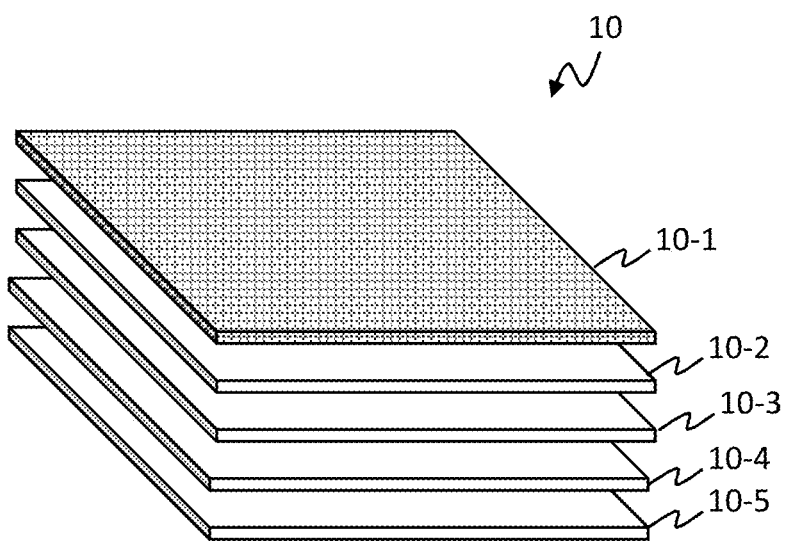
Figure 8:
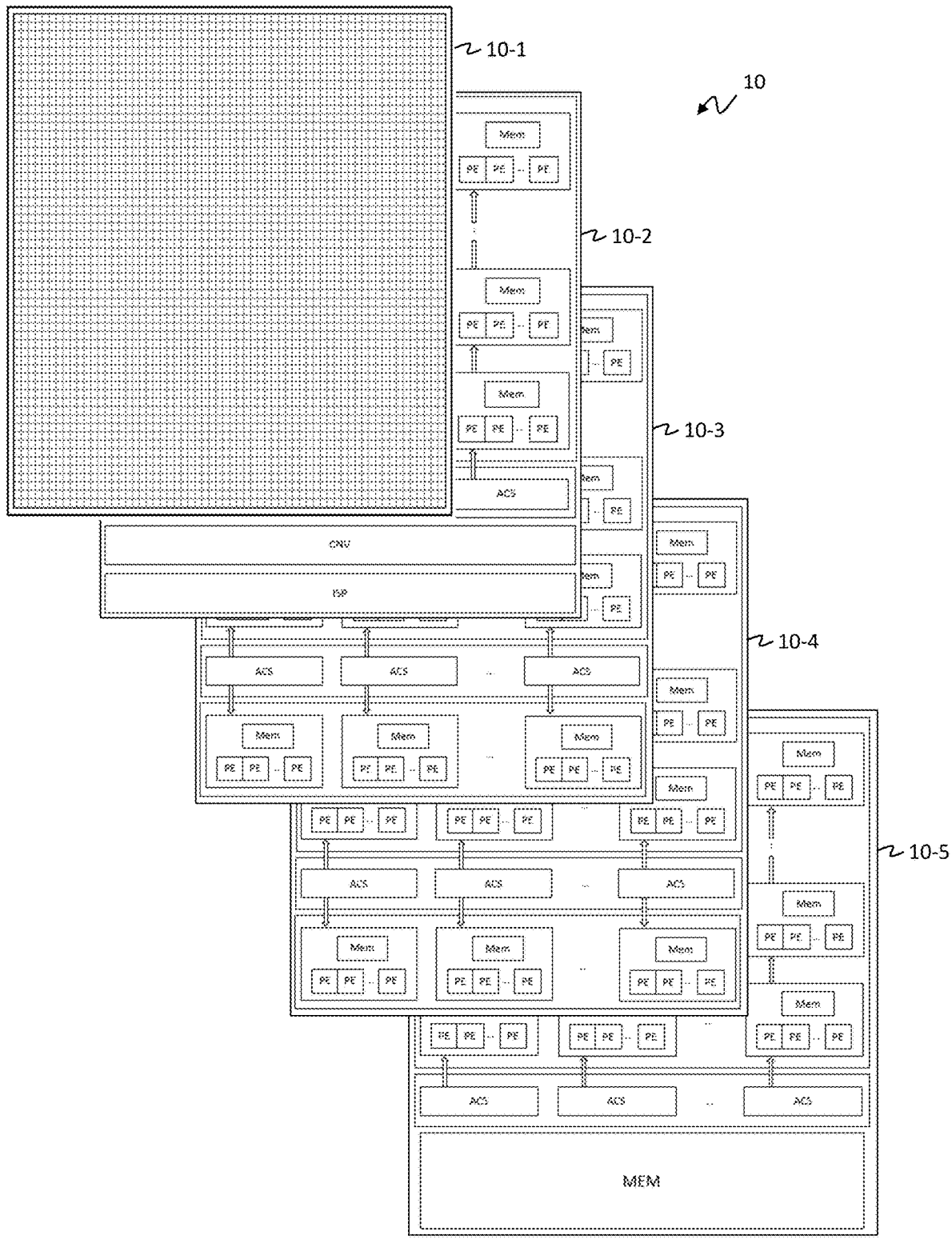
Figure 9:
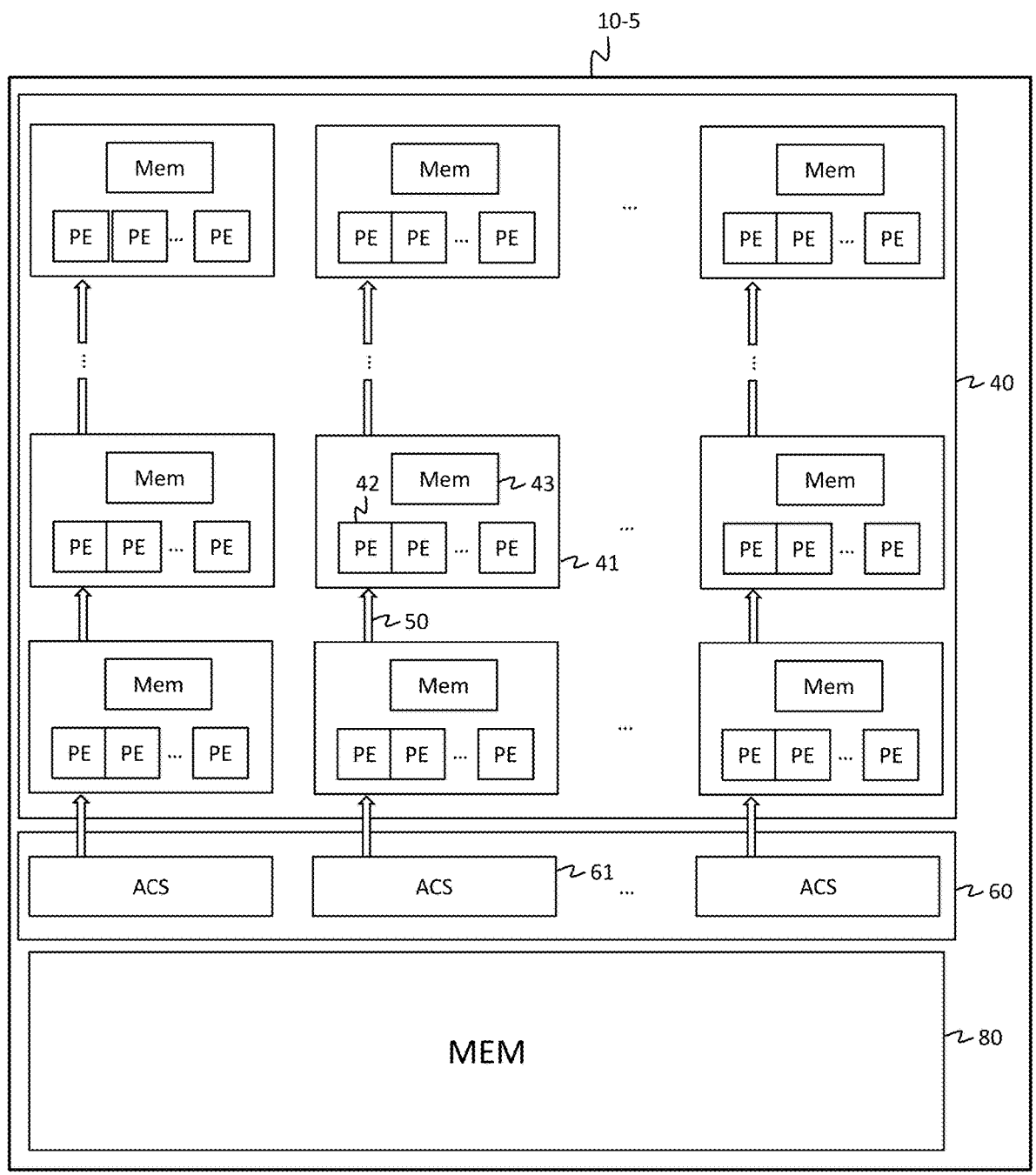
Figure 10:
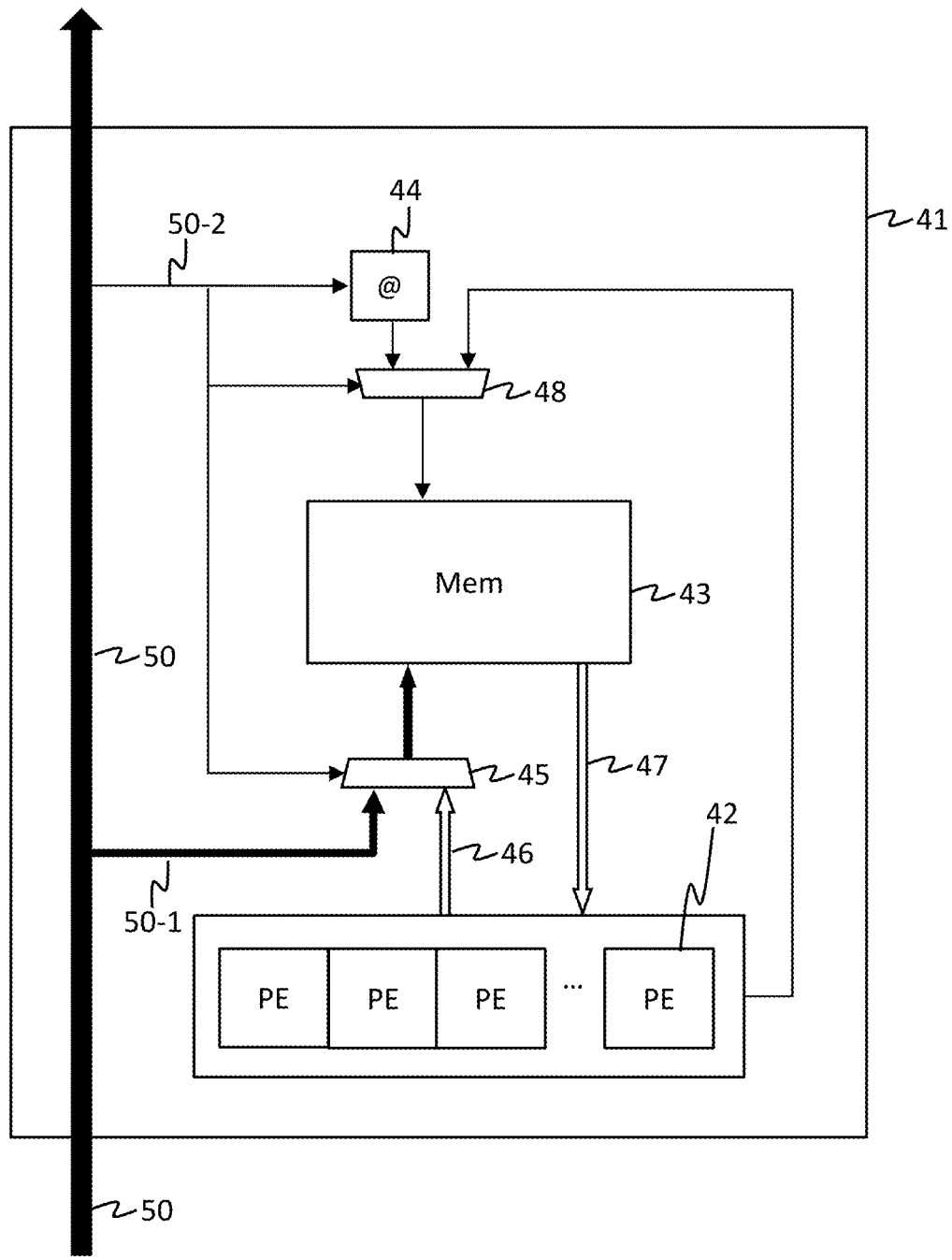

The invention will be better understood upon reading the following description, given as a non-limiting example, and made with reference to the following figures which show:

FIG. 1 a schematic illustration of the architecture of the smart imager according to the invention, FIG. 2 a schematic illustration of a first embodiment of the smart imager in the form of a three-dimensional integrated circuit including three stacked layers, FIG. 3 a detailed schematic illustration of the first embodiment described in FIG. 2, FIG. 4 a schematic illustration of the sensor layer of the smart imager, FIG. 5 a schematic illustration of a processing layer of the smart imager, FIG. 6 a schematic illustration of another processing layer of the smart imager, FIG. 7 a schematic illustration of a second embodiment of the smart imager in the form of a three-dimensional integrated circuit including five stacked layers, FIG. 8 a detailed schematic illustration of the second embodiment illustrated in FIG. 7, FIG. 9 a schematic illustration of a processing layer of the smart imager according to the second embodiment, FIG. 10 a schematic illustration of a computing unit of the parallel processing processor integrated into the smart imager.

In these figures, identical references from one figure to another refer to identical or similar elements. For clarity, the illustrated elements are not necessarily plotted to the same scale, unless stated otherwise.

DETAILED DESCRIPTION OF THE INVENTION

FIG. 1 schematically shows a computing architecture of the smart imager according to the invention. This is a functional illustration of different electronic components implemented on a three-dimensional (3D) integrated circuit forming the smart imager.

FIGS. 2 and 3 show a first example of a stack of three integrated circuit layers 10-1, 10-2, 10-3 to form the three-dimensional integrated circuit 10 forming the smart imager.

By "integrated circuit", it should be understood a microelectronic circuit which comprises analog and/or digital active electronic components made based on a semiconductor material, as well as metal tracks allowing electrically interconnecting the electronic components together. The expression "semiconductor material" encompasses any material having semiconductor properties (amorphous or polycrystalline semiconductor like for example silicon, carbon nanotubes, semiconductor oxide, etc.).

As illustrated in FIG. 2, the three layers 10-1, 10-2, 10-3 are stacked on top of one another. Each layer of the stack is electrically connected to at least one other layer by means of through electrical connections 11. Such a connection 11 allows vertically crossing the semiconductor substrate of one layer to electrically connect two electronic components made in two different layers of the stack).

As indicated before different manufacturing methods may be considered to make the different layers 10-1, 10-2, 10-3, like for example a parallel 3D integration, a sequential 3D integration, or a mix of these two techniques. In the case of a parallel 3D integration, the through electrical connections 11 may be in the form of TSV-type connections ("Through-Silicon Vias"); in the case of a sequential 3D integration, the through electrical connections 11 may be in the form of MIV-type connections ("Monolithic Inter-tier Via"). The through electrical connections 11 may also be made by means of contact pads or microbeads.

The first layer 10-1 of the stack (upper layer located at the top of the stack) is so-called "sensor layer". The sensor layer 10-1 is schematically illustrated in more details in FIG. 4. The sensor layer 10-1 includes a photosensitive sensor including an array 20 of pixels 21. The photosensitive sensor may operate in the visible range or in the infrared range, depending on the targeted application.

Each pixel 21 of the array 20 of the photosensitive sensor corresponds to a photodetector. For example, a photodetector is formed by a photodiode (PN junction), a phototransistor, a photodiode associated with transfer gates, or a photodetector made in an organic or colloidal photosensitive layer. Conventionally, each pixel is configured to supply an analog signal representative of a received luminous intensity.

The photosensitive sensor may be made according to a back-side illumination configuration (BSI sensor). In a BSI configuration, the photodetectors are positioned at the top side of the sensor layer 10-1 (the face that is opposite to the layer 10-2 located immediately beneath the sensor layer 10-1), and the metal tracks (routing) are positioned at the underside of the sensor layer 10-1 (the face that is opposite the layer 10-2 located immediately beneath the sensor layer). The BSI configuration allows optimising capture of the photons by the photodetectors.

According to another example, the photosensitive may be made according to a front-side configuration (FSI sensor). In an FSI configuration, the photodetectors are positioned at the underside of the sensor layer 10-1, and the metal tracks (routing) are positioned at the top side of the sensor layer 10-1. The FSI configuration allows simplifying the manufacture of the sensor layer. In return, the routing portion reflects a portion of the light and reduces the amount of photons detected by the photodetectors.

In the considered example, the array 20 includes 3,072 rows of 4,096 pixels (the array 20 therefore includes 4,096 columns of 3,072 pixels, it consists of an array of 4,096× 3,072 pixels). Each pixel 21 occupies a surface of 1 µm² (one square micrometre). The silicon surface of the sensor layer 10-1 is about 12 mm². The thickness of the sensor layer 10-1 is smaller than 300 µm.

The different functional blocks described in FIG. 1 are implemented on the layers 10-2 and 10-3 which are located beneath the sensor layer 10-1. The layers 10-2 and 10-3 located beneath the sensor layer are so-called "processing layers".

FIG. 5 schematically shows the processing layer 10-2 located immediately beneath the sensor layer 10-1. The layer 10-2 corresponds to the second layer of the stack forming the three-dimensional integrated circuit 10. FIG. 6 schematically shows the processing layer 10-3 located beneath the second layer 10-2. The layer 10-3 corresponds to the third layer of the stack forming the three-dimensional integrated circuit 10.

As illustrated in FIG. 1, the three-dimensional integrated circuit 10 forming the smart imager according to the invention includes a conversion block 30, a parallel processing processor 40, a data bus 50 and a control block 60.

The conversion block 30 is intended to transform the analog signals supplied by the pixels 21 of the array 20 of the photosensitive sensor into digital data. In the considered example, and as illustrated in FIGS. 3 and 5, the conversion block 30 is implemented on the processing layer 10-2 located immediately beneath the sensor layer 10-1. The conversion block 30 is also referred to by the term "CNV" in the figures.

It should be noted that the conversion block 30 could also be implemented on another layer, for example on a lower processing layer, and even on the sensor layer 10-1. Nothing would also prevent the conversion block 30 from being implemented on several layers (for example different portions of the conversion block could be implemented on several processing layers, or a portion of the conversion block could be implemented on the sensor layer and other portions of the conversion block could be implemented on one or more processing layer(s)).

As illustrated in FIG. 1, the conversion block 30 includes analog-to-digital converters 31 (ADCs 31). The conversion block 30 may also include other electronic components, like for example an analog circuit for amplifying and shaping the signals, a pixel row or column decoder, a pixel readout circuit ("readout circuit"), etc. These components are not illustrated in the figures. The ADCs 31 of the conversion block are arranged at the root of the columns of the array 20 of pixels of the photosensitive sensor ("column ADC" type arrangement). In other words, each column of pixels of the photosensitive sensor is associated with one ADC 31. In the considered example, the conversion block 30 therefore includes 4096 ADCs.

As schematically illustrated in FIG. 2, each column of pixels of the array 20 of the photosensitive sensor of the sensor layer 10-1 is electrically connected to an ADC 31 of the conversion block 30 by means of a through electrical connection 11 (via).

Conventionally, each ADC 31 is adapted to digitise the analog signals of the pixels of the column to which the ADC is related (each analog signal being representative of a luminous intensity received by one pixel).

In the considered example, the parallel processing processor 40 is configured to execute an intensive image analysis processing based on an artificial intelligence algorithm, for example for shape, object, or face recognition, or for event detection in images (for example movement detection). For example, the artificial intelligence algorithm is a deep neural network type algorithm.

To be able to be implemented under the photosensitive sensor, the processing processor 40 should comply with strong constraints in terms of consumed power, heat-up, surface, and computing capacity. To provide a large computing capacity, under power, heat-up and surface constraints, the processing processor 40 follows a parallel architecture organised into a plurality of groups ("clusters") of elementary processors. Thus, and as illustrated in FIG. 1, the parallel processing processor 40 includes a plurality of computing units 41. Each computing unit 41 includes several elementary processors 42 and a memory 43 shared between the elementary processors 42 of the computing unit 41.

To enable a real-time image analysis, the digital data representative of the pixels of the sensor should be conveyed towards the distributed memories 43 of the parallel processing processor 40 with a minimum latency.

It should be noted that the shared memory 43 could be a monolithic memory shared between the different elementary processors 42, or a memory including several memory banks shared between the different elementary processors 42 (the different memory banks could possibly be accessed simultaneously to increase the bandwidth).

In the considered example described with reference to FIGS. 2 to 6, the parallel processing processor 40 is implemented in part on the processing layer 10-2 (i.e. on the second layer 10-2 of the stack, which also corresponds to the first processing layer) and in part on the processing layer 10-3 (i.e. on the third layer 10-3 of the stack, which also corresponds to the second processing layer). As illustrated in FIGS. 1, 5 and 6, the computing units 41 of the parallel processing processor 40 are arranged in an array-like fashion according to several rows and several columns. As illustrated in FIGS. 5 and 6, a portion of the rows of computing units 41 is implemented on the processing layer 10-2, and another portion of the rows of computing units 41 is implemented on the processing layer 10-3.

It should be noted that this example is not restrictive. For example, nothing would prevent the parallel processing processor 40 from being completely implemented on the processing layer 10-2 located immediately beneath the sensor layer (second layer of the stack). Nothing would also prevent it from being implemented on one or more processing layer(s) located beneath the second layer 10-2 of the stack.

In the considered example, the parallel processing processor 40 is a PNeuro-type processor as described in the document "PNeuro: a scalable energy-efficient programmable hardware accelerator for neural networks", A. Carbon et al., Design, Automation And Test in Europe (DATA) 2018, pages 1045-1050. For example, a computing unit 41 corresponds to a neural computing block (or NCB, acronym standing for "Neural Computing Block"). For example, the processing layer 10-2 includes three rows of sixteen computing units 41. For example, the processing layer 10-3 includes three other rows of sixteen computing units 41. Nonetheless, nothing would prevent either one or both of the processing layers 10-2 and 10-3 from including another number (more or less than three) of rows of computing units 41. Nothing would also prevent a row of computing units 41 from including another number (more or less than sixteen) computing units 41. In the considered example, each of the processing layers 10-2 and 10-3 occupies a silicon surface of about 11 mm$^2$. The thickness of the layer 10-2 is comprised between 10 and 30 µm. The thickness of the layer 10-3 is in the range from 200 to 300 µm. The total thickness of the three-dimensional integrated circuit 10 is smaller than 500 µm.

The data bus 50 and the control block 60 offer the function of a communication network allowing conveying the digital data at the output of the conversion block 30 towards the shared memories 43 of the different computing units 41. It is important to note that the digital data are conveyed "directly" from the conversion block 30 towards the different computing units 41. This means that, in the proposed smart imager architecture, there is no intermediate buffer memory to memorise the pixel digital data between an ADC 31 and the processing processor 40. In other words, the digital data are conveyed directly from the conversion block 30 towards the shared memories 43 of the computing units 41 without being memorised in another intermediate memory. In the considered example with a PNeuro-type processor, each shared memory 43 includes four memory banks.

As illustrated in FIGS. 5 and 6, the data bus 50 and the control block 60 are implemented on the processing layers 10-2 and 10-3 on which the parallel processing processor 40 is implemented.

Each computing unit 41 of the processing processor 40 is configured to process digital data corresponding to an area (a subset) of pixels 21 of the array 20 of the photosensitive sensor implemented on the sensor layer 10-1.

The elementary processors 42 of the computing units 41 of the processing processor 40 are intended to be configured to read digital data memorised in the shared memory 43 of the computing unit 41 to which they belong, and to execute the image analysis algorithm directly from the read data. This direct interface towards the computing units 41, without any intermediate buffer memory, allows processing the pixel data the earliest after the digital conversion.

The control block 60 is configured such that all digital data representative of the same row of pixels are conveyed simultaneously towards different computing units 41. Thus, the computing units 41 having received digital data relating to one or more rows of pixels of the array could start processing thereof while digital data relating to one or more other rows of pixels are conveyed towards other computing units. This allows considerably limiting latency in the image analysis processing.

As illustrated in FIGS. 1, 5 and 6, the control block 60 includes several control sub-blocks 61. In particular, the control sub-blocks 61 may encapsulate the data to be transmitted in messages including at least one destination address (an address identifying a computing unit 41 amongst the different computing units 41 of the parallel processing processor 40). The control sub-block 61 may also transmit control and/or synchronisation information (for example a signal allowing signalling the beginning or the end of processing of an image). In the figures, the control sub-blocks 61 are referred to by the acronym ACS (acronym standing for "Address, Control and Synchronisation"). Advantageously, and as illustrated in FIGS. 1, 5 and 6, each control sub-block 61 may be connected, via one branch of the data bus 50, to all of the computing units 41 of the same column of computing units 41.

As illustrated in FIG. 2, two control sub-blocks 61 located on two different processing layers 10-2, 10-3 may be connected by through connections 11. This allows supplying the pixel data to all of the computing units 41 of the processing processor 40 distributed over the different processing layers.

It should be noted that a piece of digital data at the output of the conversion block 30 may be representative of one single pixel 21 or of one group (an area) of pixels 21 of the array 20 of the photosensitive sensor.

In the considered example, and as illustrated in FIG. 1, the conversion block 30 includes five-hundred-and-twelve (512) pixel grouping blocks 32. A grouping block 32 is referred to by the letter "B" (standing for "binning") in FIG. 1. Each pixel grouping block 32 is connected to eight ADCs 31 associated with eight successive columns of the array 20 of pixels. Each grouping block 32 is configured to supply digital data representative of a group of 8×8 pixels 21 of the array 20 of pixels. In such a case, a piece of digital data at the output of a grouping block 32 is representative of an area of sixty-four (8×8=64) pixels of the photosensitive sensor. For example, this piece of digital data is a weighted mean of sixty-four pixels processed by the grouping block 32. This results in an overall reduction of the image resolution by 8×8 (the resolution is reduced from 4,096×3,072 to 512×384) while preserving the visual information in the image. Since the resolution is reduced, the intensive analysis processing requires less memory and less computations, and therefore the processing time and the electrical consumption are reduced. The grouping block 32 executes a very simple processing in line and on the fly which introduces no latency. Every eight ADC clock cycles, a new piece of digital data representative of a group of 8×8 pixels is produced.

Each control sub-block 61 simultaneously receives thirty-two digital data supplied by thirty-two consecutive grouping blocks 32 (each piece of digital data being representative of an area of 8×8 pixels). Each control sub-block 61 serialises these thirty-two digital data on the data bus 50 without any bandwidth loss (the operation frequency of a control sub-block 61 is therefore at least thirty-two times lower than that of an ADC). These thirty-two digital data are conveyed towards at least one processing unit 41.

In the considered example, wherein the processing processor 40 is organised into six rows of sixteen computing units 41, each of the sixteen computing units 41 of the same row simultaneously receives thirty-two digital data which represent a total of eight rows of pixels (namely 4,096×8 pixels). Within sixty-four ADC clock cycles, one row of computing units 41 has received the digital data representative of one sixth of the pixels of an image (i.e. 512 rows of pixels, namely 4,096×512 pixels). Once they have received their digital data, the computing units 41 of the same row could then start their processing while other digital data relating to other rows of pixels are conveyed towards other computing units of another row.

Nonetheless, it should be noted that the use of the grouping blocks 32 is optional. Without the grouping blocks 32, a piece of digital data at the output of the conversion block 30 is representative of one single pixel 21 of the array 20.

In particular embodiments, the control block 60 may be configured to convey the same digital data towards at least two distinct computing units 41 while transmitting said digital data only once on the data bus 50. Thus, it is possible to make a redundancy function (for example when the same pixel digital data are transmitted to at least two distinct computing units 41) or a thumbnail processing function with overlapping areas (for example when only one portion of the pixel digital data intended for a computing unit 41 is also transmitted to another computing unit 41). Being able to transmit the same digital data to several distinct computing units 41 in one single transmission on the data bus 50 avoids the introduction of latency in the processing.

As illustrated in FIG. 1, the three-dimensional integrated circuit 10 forming the imager may also optionally include an optimisation processor 70 distinct from the parallel processing processor 40. The optimisation processor 70 is referred to as "ISP" in the figures (acronym standing for "Image Signal Processor").

For example, the optimisation processor 70 is adapted to execute an optimisation or error correction algorithm, and to output an image stream on an output interface (for example a MIPI interface).

In the considered example, and as illustrated in FIGS. 3 and 5, the optimisation processor 70 is implemented on the processing layer 10-2. Nonetheless, nothing would prevent the optimisation processor 70 from being implemented on another processing layer, or from being implemented on several different processing layers.

Advantageously, the digital data at the output of the conversion block 30 are conveyed to the optimisation processor 70 via a route distinct from the data bus 50, for example via another data bus distinct from the data bus 50 that feeds the shared memories 43 of the computing units 41 of the parallel processing processor 40.

The use of two distinct routes to convey the digital data towards the parallel processing processor 40 and towards the optimisation processor 70 enables a simultaneous processing for image improvement and for intensive image analysis. Thanks to this decoupling, the image optimisation and/or optical defect correction processing implemented by the optimisation processor 70 does not add any additional latency to the intensive image analysis processing implemented by the parallel processing processor 40.

It should be noted that the embodiment described hereinbefore with reference to FIGS. 2 to 6 is a non-limiting example. In particular, the number of processing layers in the stack forming the three-dimensional integrated circuit 10 could be different (for example one single processing layer, or more than two processing layers). The same applies to the number of computing units 41 of the parallel processing processor 40.

FIGS. 7 to 9 show another embodiment of a smart imager according to the invention. In this example, the three-dimensional integrated circuit 10 includes five layers: a sensor layer 10-1 and four processing layers 10-2 to 10-5.

The sensor layer 10-1 is similar to that one described hereinbefore with reference to FIGS. 2 to 4. The processing layer 10-2 is similar to the processing layer 10-2 described hereinbefore with reference to FIGS. 2, 3 and 5. The processing layers 10-3 and 10-4 are similar to the processing layers 10-3 described hereinbefore with reference to FIGS. 2, 3 and 6.

The processing layer 10-5 is described in FIG. 9. The processing layer 10-5 includes a portion of the parallel processing processor 40 as well as a portion of the control block 60 and of the data bus 50. Furthermore, the processing layer 10-5 includes a mass memory 80 which could be used for example to store weights and parameters of one or more artificial intelligence algorithm(s) intended to be executed by the parallel processing processor 40. This mass memory 80 may be made based on the SRAM technology (acronym standing for "Static Random Access Memory") or with a non-volatile technology to obtain more memory density. The processing layer 10-5 is connected to the processing layer 10-4 located above it by through connections 11 at the control sub-blocks 61, in a fashion similar to what has been described before with reference to FIG. 2. In turn, the processing layer 10-5 also occupies a silicon surface of about 11 mm$^2$.

The three-dimensional integrated circuit 10 could also optionally include an event approximate detection preprocessor used to wake up the parallel processing processor 40 when an event approximate detection is detected. Such arrangements allow placing the parallel processing processor 40 in the standby mode as long as no event approximate detection is detected by the preprocessor. For example, the preprocessor may be implemented on the processing layer 10-2, and/or on one or more other processing layers. An additional pixel grouping step may possibly be considered to further reduce the resolution of the data supplied to the preprocessor (for example a resolution of 108×76 pixels).

In the example illustrated in FIGS. 7 to 9, the thickness of each of the layers 10-2 to 10-4 is comprised between 10 and 30 μm. The thickness of the layer 10-5 is in the range from 200 to 300 μm.

FIG. 10 schematically shows an embodiment of a computing unit 41 of the parallel processing processor 40. FIG. 10 also illustrates how digital data at the output of the conversion block 30 could be conveyed towards the shared memory of the computing unit 41 with the data bus 50 under the control of a control sub-block 61 (ACS block).

In the considered example illustrated in FIG. 10, a multiplexer 45 allows selecting a type of data to write in the shared memory 43. The multiplexer 48 allows selecting the address to be used for writing digital data, depending on whether the data to be written corresponds to pixel information originating from the data bus 50 or to information originating from the group of elementary processors 42. The arrow 50-1 represents a piece of digital data representative of one or more pixel(s) transmitted on the data bus 50; the arrow 50-2 represents a piece of control or synchronisation information emitted by an ACS block on the data bus 50; the arrow 46 represents a piece of data originating from the group of elementary processor 42 to be written in the shared memory 43; the arrow 47 represents a piece of data read by the group of elementary processors 42. The computing unit 41 includes a filtering block 44 which is intended to detect whether, or not, a piece of digital data transmitted on the data bus 50 should be processed by the computing unit 41 and, where appropriate, determine a local address of the shared memory 43 at which the piece of data should be written.

Different options may be considered to convey the digital data at the output of the conversion block 30 towards the different computing units 41.

According to a first example, the transport of data is done "point-to-point", or "point-to-multipoint". In this case, the control block 60 is configured to encapsulate a piece of digital data in a message including at least one addressing identifier corresponding to at least one computing unit 41 and to broadcast said message on the data bus 50 towards several computing units 41. The filtering block 44 is configured to detect, according to said at least one addressing identifier, whether or not the digital data included in the message should be processed by the computing unit 41.

According to a second example, the data transport is implemented by broadcasting. In this case, the filtering block 44 is configured to detect, according to a number of received digital data, whether or not a received piece of digital data should be processed by the computing unit 41. For example, the control block 60 is configured to emit a synchronisation signal on the data bus 50 to indicate the beginning of the processing of a new image; the filtering block 44 knows that it will receives a stream of digital data associated with this new image on the data bus; and the filtering block 44 also knows the ranks of the digital data that the computing unit 41 to which it is related should process in this stream.

The description provided hereinabove clearly illustrates that, by its different features and the advantages thereof, the present invention achieves the objectives set. In particular, the arrangement of the ADCs at the root of the columns allows efficient sharing over the columns of pixels. Thus, the surface occupied by the ADCs is optimised and the read circuit is simplified. The arrangement of the ADCs at the root of the column allows obtaining a higher density of photodetectors in the array of pixels, which allows improving the performances of the sensor (for example in terms of signal-to-noise or quantum efficiency).

In turn, the structure in the form of a stack of layers also allows optimising the performances (reduction in electrical consumption, strong parallelisation of the tasks performed by the circuits of the different layers).

The direct transport of the digital data from the conversion block 30 towards the shared memories 43 of the computing units 41 (without using an intermediate buffer memory) allows significantly limiting latency in the processing of the images, the bulk of the imager, and the power consumed by the imager.

The use of a parallel processing processor 40 allows addressing the constraints inherent to intensive image processing (constraints in terms of consumed power, heat-up, surface area, and computing capacity). Advantageously, all of the digital data representative of the same row of pixels are conveyed simultaneously towards different computing units 41 of the parallel processing processor 40 in order to reduce latency in the processing.

The invention claimed is:

1. A smart imager comprising a three-dimensional integrated circuit comprising a stack of at least two integrated circuit layers, each layer being electrically connected to at least one other layer by means of through electrical connections, said layers comprising:
   an upper layer, so-called "sensor layer", comprising a photosensitive sensor including an array of pixels, each pixel being configured to supply an analog signal representative of a received luminous intensity,
   one or more lower layer(s), so-called "processing layers", the three-dimensional integrated circuit comprising:

a conversion block implemented on the sensor layer and/or on one or more processing layer(s), the conversion block comprising a plurality of analog-to-digital converters each associated respectively with a column of the array of pixels, the conversion block being configured to transform the analog signals supplied by the pixels into digital data, a parallel processing processor implemented on one or more processing layer(s), the parallel processing processor including a plurality of computing units, each computing unit including several elementary processors and a memory shared between the elementary processors of the computing unit, a data bus and a control bus implemented on the processing layer(s) on which the parallel processing processor is implemented, and configured to convey the digital data at the output of the conversion block directly towards the shared memories of the computing units, all of the digital data representative of the same row of pixels being conveyed simultaneously towards different computing units, wherein the control block is configured to convey the same digital data towards at least two distinct computing units while transmitting said digital data only once on the data bus.

2. The smart imager according to claim 1, wherein the conversion block is completely implemented on one or more processing layer(s).

3. The smart imager according to claim 2, wherein the conversion block is completely implemented on one single processing layer.

4. The smart imager according to claim 3, wherein the conversion block is completely implemented on the processing layer located immediately beneath the sensor layer.

5. The smart imager according to claim 3, wherein the three-dimensional integrated circuit includes at least three layers, and the parallel processing processor is implemented in part on the processing layer which implements the conversion block and in part on at least one other processing layer.

6. The smart imager according to claim 1, wherein the conversion block includes pixel grouping blocks, each pixel grouping block being connected to several analog-to-digital converters associated with several successive columns of the array of pixels, each pixel grouping block being configured to supply digital data representative of a group of pixels of the array of pixels.

7. The smart imager according to claim 1, wherein the computing units are arranged in an array-like fashion according to several rows and several columns, and the control block includes several control sub-blocks, each control sub-block being connected to all of the computing units of the same column via a branch of the data bus.

8. The smart imager according to claim 1, wherein the three-dimensional integrated circuit further includes an optimisation processor distinct from the parallel processing processor, implemented on one or more processing layer(s), and wherein digital data at the output of the conversion block are conveyed to the optimisation processor via a route distinct from the data bus.

9. The smart imager according to claim 1, wherein the control block is configured to encapsulate digital data into a message including at least one addressing identifier corresponding to at least one computing unit, and to broadcast said message over the data bus towards several computing units, and wherein each computing unit includes a filtering block configured to detect, according to said at least one addressing identifier, whether the encapsulated digital data in the message should be processed by the computing unit or not.

10. The smart imager according to claim 1, wherein each computing unit includes a filtering block configured to detect, according to a number of received digital data, whether received digital data should be processed by the computing unit or not.

* * * * *